US009633360B2

(12) United States Patent
Gorodyansky

(10) Patent No.: US 9,633,360 B2
(45) Date of Patent: *Apr. 25, 2017

(54) METHOD AND APPARATUS FOR IMPLEMENTING SEARCH ENGINE WITH COST PER ACTION REVENUE MODEL

(71) Applicant: Anchorfree Inc., Mountain View, CA (US)

(72) Inventor: David Gorodyansky, San Francisco, CA (US)

(73) Assignee: Anchorfree Inc., Menlo Park, CA (US)

( * ) Notice: Subject to any disclaimer, the term of this patent is extended or adjusted under 35 U.S.C. 154(b) by 386 days.

This patent is subject to a terminal disclaimer.

(21) Appl. No.: 14/034,529

(22) Filed: Sep. 23, 2013

(65) Prior Publication Data

US 2014/0164085 A1 Jun. 12, 2014

Related U.S. Application Data

(63) Continuation of application No. 12/685,504, filed on Jan. 11, 2010, now Pat. No. 8,543,561, which is a continuation of application No. 11/291,442, filed on Nov. 30, 2005, now Pat. No. 7,647,305.

(51) Int. Cl.
*G06F 17/30* (2006.01)
*G06Q 30/02* (2012.01)

(52) U.S. Cl.
CPC ........ *G06Q 30/0215* (2013.01); *G06Q 30/02* (2013.01); *G06Q 30/0226* (2013.01); *G06Q 30/0246* (2013.01); *G06Q 30/0247* (2013.01); *G06Q 30/0256* (2013.01); *G06Q 30/0273* (2013.01); *Y10S 707/99933* (2013.01)

(58) Field of Classification Search
CPC ............. G06Q 30/02; G06Q 30/0273; G06Q 30/0215; G06Q 30/0226; G06Q 30/0246; G06Q 30/247; G06Q 30/256; G06Q 30/273
USPC ........................................ 707/706, 722, 738
See application file for complete search history.

(56) References Cited

U.S. PATENT DOCUMENTS

| | | | | |
|---|---|---|---|---|
| 6,516,311 | B1* | 2/2003 | Yacoby | G06F 17/30887 707/999.003 |
| 7,647,305 | B2* | 1/2010 | Gorodyansky | G06Q 30/02 707/999.003 |
| 8,543,561 | B2* | 9/2013 | Gorodyansky | G06Q 30/02 707/706 |
| 2002/0055894 | A1* | 5/2002 | Hyder | G06Q 40/12 709/224 |
| 2002/0106119 | A1* | 8/2002 | Foran | G06F 19/321 382/133 |
| 2005/0027596 | A1* | 2/2005 | Bender | G06Q 30/02 705/14.1 |

* cited by examiner

*Primary Examiner* — Vincent Boccio
(74) *Attorney, Agent, or Firm* — TransPacific Law Group; Pavel I. Pogodin

(57) ABSTRACT

The inventive technology enables the search engine operator to charge the advertisers who place their links on the search engine only if the user uses the search results to visit the advertiser's web portal(s) and generates revenue for the advertiser. This concept is especially attractive to the advertisers because it eliminates the risk, which the advertisers face in conventional search engines, when they are changed by the search engine per user click irrespectively of whether the user's visit resulted in advertiser's revenue.

20 Claims, 3 Drawing Sheets

METHOD AND APPARATUS FOR IMPLEMENTING SEARCH ENGINE WITH COST PER ACTION REVENUE MODEL

CROSS-REFERENCE TO RELATED PATENT APPLICATIONS

The present application is a continuation application of U.S. patent application Ser. No. 12/685,504 filed on Jan. 11, 2010, issued as U.S. patent No. 8,543,561, which is a continuation application of U.S. patent application Ser. No. 11/291,442 filed on Nov. 30, 2005, issued as U.S. patent No. 7,647,305, which is related to commonly owned U.S. patent application Ser. No. 11/292,187 (U.S. patent application publication No. 2006/0265501) entitled "SYSTEM AND METHOD FOR ENABLING WIRELESS INTERNET ACCESS IN PUBLIC AREAS", now abandoned, and commonly owned co-pending U.S. patent application Ser. No. 11/291,688 (U.S. patent application publication No. 2007/0136295) entitled "COMPUTERIZED SYSTEM AND METHOD FOR ADVANCED ADVERTISING," filed on the same day, all of which are incorporated by reference herein.

FIELD OF THE INVENTION

The present invention relates generally to networking technology and more specifically to a computerized networking search engine.

DESCRIPTION OF THE RELATED ART

Search engines such as Google derive their revenue from displaying to the users advertisings paid for by sponsors. Specifically, in response to the user query, a search engine performs a search of pre-stored set of web pages and returns the results containing information retrieved from the web. To generate its revenue, the search engine also shows the user sponsored advertisements, which are usually placed above the results retrieved from the web. When the user uses links associated with the displayed sponsored advertisements, the sponsors pay the listing fees to the search engine, based on the number of users' visits.

The most significant problem associated with the conventional search engines is that the advertiser pays the search engine fees without regard to the actual revenue derived by the advertiser from the users directed to the advertised by the search engine. In other words, the advertiser must pay the search engine even if the visitors did not order any goods or services from the advertiser. Essentially, the advertiser has to estimate whether the fees paid to the search engine are justified by the additional customer traffic that it brings.

What is needed is a methodology and a system which would enable the advertiser to pay the search engine an amount of fees based on the amount of additional revenue that the traffic from the search engine generates for the advertiser. Moreover, the need exists for a search engine that pays its users back a portion of revenues generated by user actions and enables consumers to share in revenues from cost per action advertisers on the search engine. Such system would enable Internet users to participate in the growing online search market and to receive revenues generated by their online activities.

SUMMARY OF THE INVENTION

The inventive methodology is directed to methods and systems that substantially obviate one or more of the above and other problems associated with conventional internet search engine systems.

One aspect of the inventive concept is a computerized search and advertising system. The inventive system includes a web interface operable to receive a search query from a user specifying search information. The inventive system further includes a search system operable to receive the search query from the web interface and to generate a search request based on the search query. A search engine is operable to receive the search request from the search system and to provide to the search system a set of search results responsive to the search request. The inventive system further includes a database operable to store a plurality of paid advertisings. The search system receives a set of search results, retrieves at least one paid advertising information from the database. The retrieved paid advertising is relevant to the search information and includes a paid advertising link. The search system further inserts the at least one paid advertising link into the plurality of search results; and causes the web interface to display the inserted paid advertising link as well as the set of search results to the user.

In accordance with a feature of the invention, the operator of the search and advertising system receives payment only if the user uses the paid advertising link to generate revenue.

Another aspect of the inventive concept is a computer-implemented method. In accordance with the inventive method, a search query is received from a user, the search query specifying search information. A search request is generated based on the search query and forwarded to a search engine. A set of search results responsive to the search request is received from the search engine. Subsequently, at least one paid advertising information is retrieved from a database. The retrieved paid advertising is relevant to the search information and includes a paid advertising link. The at least one paid advertising link is inserted into the search result set. Finally, the web interface displays the inserted paid advertising link and the search results set to the user.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

The inventive technology enables the search engine operator to charge the advertisers who place their links on the search engine only if the user uses the search results to visit the advertiser's web portal(s) and generates revenue for the advertiser. This concept is especially attractive to the advertisers because it eliminates the risk, which the advertisers face in conventional search engines, when they are charged by the search engine per user click irrespectively of whether the user's visit resulted in advertiser's revenue.

In addition, an embodiment of the inventive system track's user's behavior and authorizes payments to the users based on the share of the revenue received from the content providers.

Figure 1:
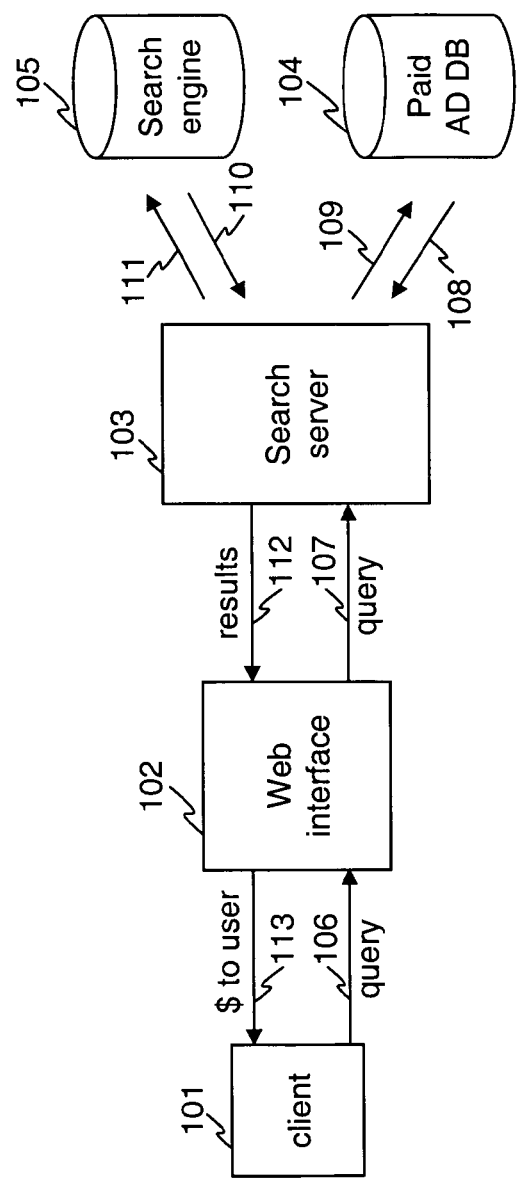
FIG. 1 depicts a conceptual block-diagram of an embodiment of the inventive computerized search engine system.

FIG. 1 illustrates an exemplary embodiment of the computerized internet search engine system in accordance with an embodiment of the inventive concept. In FIG. 1, a client 101 send a search query 106, 107 to the inventive search system 103 through its web interface 102. The search engine performs the search of the internet content by accessing 110 the search engine 105, which may be one of the well-known search engines available on the Internet, including, without limitation, Google, Yahoo, MSN, Alta Vista, etc. The search engine 105 stores and indexes multiple web pages in its internal storage. After executing the query 107, the search engine 105 returns the query result 111 to the search system 103. The search system 103 receives the query results from the search engine 105 and integrates them with paid advertising materials that are stored in the paid advertising database 104. To this end, the search system 103 issues a query 109 to the paid advertising database 104 in order to identify the paid advertisements which best match the user's query 106. The search query results together with integrated advertisement materials 112 are sent by the search system 103 to the client 101 through the web interface 102. In another alternative embodiment of the inventive concept, the search system 103 itself integrates an internal search engine subsystem (not shown), which is used to execute user queries.

Figure 2:
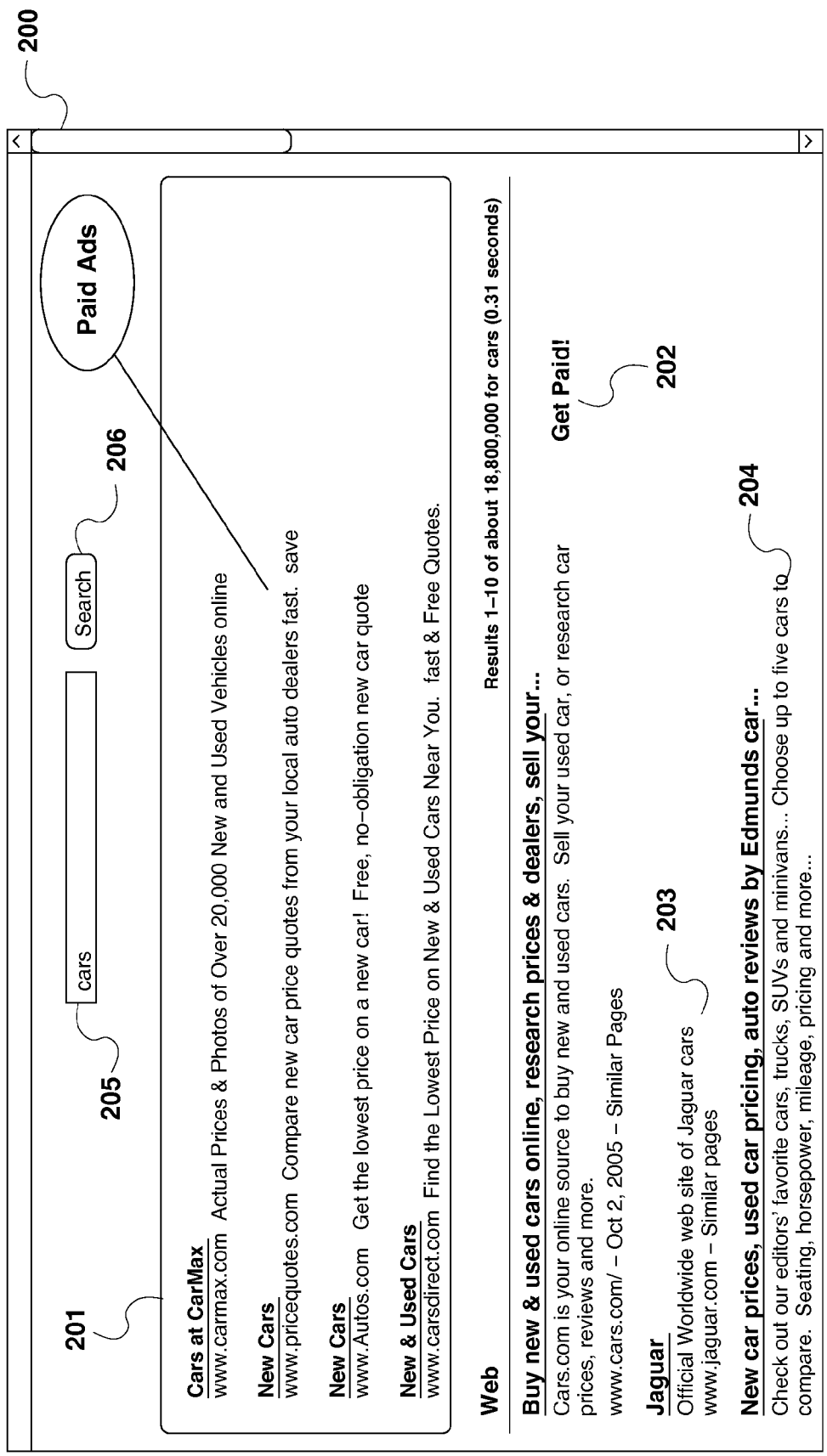
FIG. 2 depicts an exemplary search results page generated by an embodiment of the inventive computerized search engine system.

An exemplary embodiment of the search result page containing search query results together with integrated advertisement materials, designated in FIG. 1 by numeral 112 is depicted in FIG. 2. The depicted search result page includes "free" search results 203 and 204, which have been retrieved from the web. These results are also refereed to as "free" search results because they are not sponsored or paid for by an advertiser. The result 202 is an example of a sponsored result or link, which has been retrieved by the inventive search system from the paid advertisements database and inserted into the results page. If a user uses this link to access the advertiser website and makes a purchase, in accordance with the inventive concept, the advertiser authorizes a payment to the search engine operator. The exact mechanism for tracking the purchase transaction and recording the payment is not essential to the present invention. Specifically, the purchase may be detected by the advertiser's e-commerce system, which would also determine that the customer was sent to the advertiser's website by the inventive search engine. Pursuant to this information, the payment may be recorded in an advertiser's database. The sponsor-paid advertisement is designated in search result page by numeral 202. Optionally, this page may contain the search term input field 205/206. Finally, the search result page may also include advertiser-sponsored links inserted by the search engine 105. Such links are not handled by the inventive search system and are designated with numeral 201.

The amount of the payment received by the operator of the inventive system from advertiser may have any predetermined relationship to the amount of revenue realized by the advertiser from the specific user visit. One example of such relationship may be a proportionate relationship or a certain percentage.

In an embodiment of the inventive system, portion of the payment received by the operator of the inventive search system from the advertiser is rebated back to the user. For this purpose, the user may be required to establish a user account to enable the inventive system to track user activities and to store information on the credit due the user. To implement this functionality, the inventive system may additionally include a database system for storing user and payment information. As will be appreciated by those of skill in the art, such rebate system provides additional incentives for users to user the inventive system for searching.

It will be appreciated by those of skill in the art, the inventive system is not limited to interoperating with only one advertiser or only one external search engine. In an embodiment of the inventive search system, the user may specify which external search engine should be used to retrieve the web search results.

Figure 3:
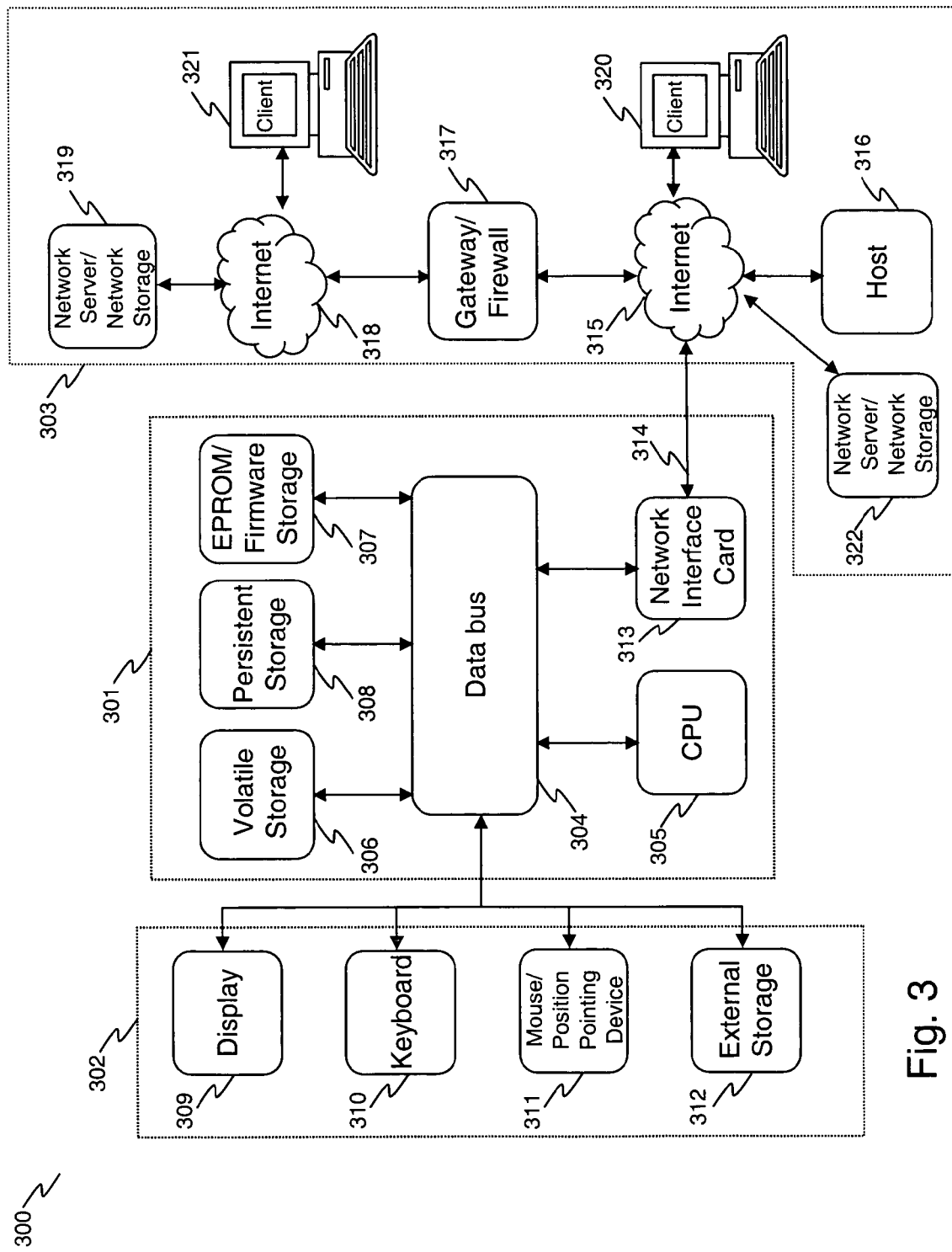
FIG. 3 illustrates an exemplary embodiment of a computer platform upon which the inventive computerized search engine system may be implemented.

FIG. 3 is a block diagram that illustrates an embodiment of a computer/server system 300 upon which an embodiment of the inventive methodology may be implemented. The system 300 includes a computer/server platform 301, peripheral devices 302 and network resources 303.

The computer platform 301 may include a data bus 304 or other communication mechanism for communicating information across and among various parts of the computer platform 301, and a processor 305 coupled with bus 301 for processing information and performing other computational and control tasks. Computer platform 301 also includes a volatile storage 306, such as a random access memory (RAM) or other dynamic storage device, coupled to bus 304 for storing various information as well as instructions to be executed by processor 305. The volatile storage 306 also may be used for storing temporary variables or other intermediate information during execution of instructions by processor 305. Computer platform 301 may further include a read only memory (ROM or EPROM) 307 or other static storage device coupled to bus 304 for storing static information and instructions for processor 305, such as basic input-output system (BIOS), as well as various system configuration parameters. A persistent storage device 308, such as a magnetic disk, optical disk, or solid-state flash memory device is provided and coupled to bus 301 for storing information and instructions.

Computer platform 301 may be coupled via bus 304 to a display 309, such as a cathode ray tube (CRT), plasma display, or a liquid crystal display (LCD), for displaying information to a system administrator or user of the computer platform 301. An input device 310, including alphanumeric and other keys, is coupled to bus 301 for communicating information and command selections to processor 305. Another type of user input device is cursor control device 311, such as a mouse, a trackball, or cursor direction keys for communicating direction information and command selections to processor 304 and for controlling cursor movement on display 309. This input device typically has two degrees of freedom in two axes, a first axis (e.g., x) and a second axis (e.g., y), that allows the device to specify positions in a plane.

An external storage device 312 may be connected to the computer platform 301 via bus 304 to provide an extra or removable storage capacity for the computer platform 301. In an embodiment of the computer system 300, the external removable storage device 312 may be used to facilitate exchange of data with other computer systems.

The invention is related to the use of computer system 300 for implementing the techniques described herein. In an embodiment, the inventive search system 103 may reside on a machine such as computer platform 301. In an embodiment, the management device locator server 106 may also be deployed on a machine such as computer platform 301. According to one embodiment of the invention, the techniques described herein are performed by computer system 300 in response to processor 305 executing one or more sequences of one or more instructions contained in the volatile memory 306. Such instructions may be read into volatile memory 306 from another computer-readable medium, such as persistent storage device 308. Execution of the sequences of instructions contained in the volatile memory 306 causes processor 305 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 305 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 308. Volatile media includes dynamic memory, such as volatile storage 306. Transmission media includes coaxial cables, copper wire and fiber optics, including the wires that comprise data bus 304. Transmission media can also take the form of acoustic or light waves, such as those generated during radio-wave and infra-red data communications.

Common forms of computer-readable media include, for example, a floppy disk, a flexible-disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 305 for execution. For example, the instructions may initially be carried on a magnetic disk from a remote computer. Alternatively, a remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on the data bus 304. The bus 304 carries the data to the volatile storage 306, from which processor 305 retrieves and executes the instructions. The instructions received by the volatile memory 306 may optionally be stored on persistent storage device 308 either before or after execution by processor 305. The instructions may also be downloaded into the computer platform 301 via Internet using a variety of network data communication protocols well known in the art.

The computer platform 301 also includes a communication interface, such as network interface card 313 coupled to the data bus 304. Communication interface 313 provides a two-way data communication coupling to a network link 314 that is connected to a local network 315. For example, communication interface 313 may be an integrated services digital network (ISDN) card or a modem to provide a data communication connection to a corresponding type of telephone line. As another example, communication interface 313 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 313 sends and receives electrical, electromagnetic or optical signals that carry digital data streams representing various types of information.

Network link 313 typically provides data communication through one or more networks to other network resources. For example, network link 314 may provide a connection through local network 315 to a host computer 316, or a network storage/server 317. Additionally or alternatively, the network link 313 may connect through gateway/firewall 317 to the wide-area or global network 318, such as an Internet. Thus, the computer platform 301 can access network resources located anywhere on the Internet 318, such as a remote network storage/server 319. On the other hand, the computer platform 301 may also be accessed by clients located anywhere on the local area network 315 and/or the Internet 318. The network clients 320 and 321 may themselves be implemented based on the computer platform similar to the platform 301.

Local network 315 and the Internet 318 both use electrical, electromagnetic or optical signals that carry digital data streams. The signals through the various networks and the signals on network link 314 and through communication interface 313, which carry the digital data to and from computer platform 301, are exemplary forms of carrier waves transporting the information.

Computer platform 301 can send messages and receive data, including program code, through the variety of network(s) including Internet 318 and LAN 315, network link 314 and communication interface 313. In the Internet example, when the system 301 acts as a network server, it might transmit a requested code or data for an application program running on client(s) 320 and/or 321 through Internet 318, gateway/firewall 317, local area network 315 and communication interface 313. Similarly, it may receive code from other network resources.

The received code may be executed by processor 305 as it is received, and/or stored in persistent or volatile storage devices 308 and 306, respectively, or other non-volatile storage for later execution. In this manner, computer system 301 may obtain application code in the form of a carrier wave.

It should be noted that the present invention is not limited to any specific types of wireless or wired network protocols. The requisite network configuration may be achieved using a variety of known networking protocols.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized networking system. It is intended that the specification and examples be considered as exemplary only, with a true scope and spirit of the invention being indicated by the following claims.

The invention claimed is:

1. A computerized search and advertising system comprising a hardware central processing unit, at least one non-transitory storage device and a network interface, the computerized search and advertising system further comprising:
   a. a web interface configured to receive a search query, wherein the search query specifies a search information;
   b. a search engine communicatively coupled with the web interface and configured to receive the search information from the web interface and to retrieve and provide to the web interface a plurality of search results responsive to the search information; and
   c. a database configured to store a plurality of paid advertisements, wherein the computerized search and advertising system is configured to:
      i. retrieve, using the hardware central processing unit, at least one paid advertisement from the database, wherein the retrieved paid advertisement is related to the search information or the plurality of search results and wherein the paid advertisement comprises at least one paid advertising link;
      ii. combine, using the hardware central processing unit the at least one paid advertising link with the plurality of search results;
      iii. send a response, the response comprising the combined at least one paid advertising link and the plurality of search results, the response configured to cause the combined at least one paid advertising link and the plurality of search results to be displayed;
      iv. collect account information and establish an account for the user based on the collected account information;
      v. credit the account of the user when it is determined that the paid advertising link was used to generate the revenue for the advertiser by way of the user making a purchase; and
      vi. cause information associated with the account of the user, information on an activity of the user and information on a credit amount credited to the account of the user to be stored in at least one storage area allocated on the non-transitory storage device, wherein the plurality of search results are free search results.

2. The computerized search and advertising system of claim 1, wherein an operator of the search and advertising system receives a payment only if it is determined that the paid advertising link was used to generate the revenue.

3. The computerized search and advertising system of claim 1, wherein if it is determined that the paid advertising link was used to generate the revenue, a portion of the generated revenue is received by an operator of the search and advertising system.

4. The computerized search and advertising system of claim 1, further comprising a second database configured to store the information on the credit amount credited to the account of the user.

5. The computerized search and advertising system of claim 1, wherein the information associated with the account of the user, the information on the activity of the user and the information on the credit amount credited to the account of the user is stored in the database.

6. The computerized search and advertising system of claim 1, further comprising a second database configured to store information on activity of the user.

7. The computerized search and advertising system of claim 1, wherein the paid advertising link is designated with a visual object indicating that if the user takes a predetermined action, the user would be given a credit.

8. A computer-implemented method performed in a computerized system comprising a central processing unit, at least one non-transitory storage device and a network interface, the computer-implemented method comprising:
   a. receiving, using the network interface, a search query, wherein the search query specifies a search information;
   b. retrieving a plurality of search results responsive to the search information;
   c. storing a plurality of paid advertisements in a database;
   d. retrieving at least one paid advertisement from the database, wherein the retrieved paid advertisement is related to the search information or the plurality of search results and wherein the paid advertisement comprises at least one paid advertising link;
   e. combining the at least one paid advertising link with the plurality of search results;
   f. sending a response, the response comprising the combined at least one paid advertising link and the plurality of search results, the response configured to cause the combined at least one paid advertising link and the plurality of search results to be displayed;
   g. collecting account information and establish an account for the user based on the collected account information;
   h. crediting the account of the user when it is determined that the paid advertising link was used to generate the revenue for the advertiser by way of the user making a purchase; and i. causing information associated with the account of the user, information on an activity of the user and information on a credit amount credited to the account of the user to be stored in at least one storage area allocated on the non-transitory storage device, wherein the plurality of search results are free search results.

9. The computer-implemented method of claim 8, further comprising providing a portion of the generated revenue to an operator of the search and advertising system.

10. The computer-implemented method of claim 8, further comprising providing a payment to an operator of the search and advertising system.

11. The computer-implemented method of claim 8, wherein the information on activity of the user is stored in a storage area allocated on non-transitory storage device.

12. The computer-implemented method of claim 8, wherein the information associated with the account of the user, the information on activity of the user and the information on a credit amount credited to the account of the user is stored in a storage area allocated on the non-transitory storage device.

13. The computer-implemented method of claim 8, wherein the paid advertising link is designated with a visual object indicating that if the user takes a predetermined action, the user would be given a credit.

14. The computer-implemented method of claim 8, wherein the paid advertising link is highlighted.

15. A non-transitory computer-readable medium embodying a set of instructions, which, when executed in a computerized system comprising a central processing unit, at least one non-transitory storage device and a network interface, cause the computer system to perform a method comprising:
  j. receiving, using the network interface, a search query, wherein the search query specifies a search information;
  k. retrieving a plurality of search results responsive to the search information;
  l. storing a plurality of paid advertisements in a database;
  m. retrieving at least one paid advertisement from the database, wherein the retrieved paid advertisement is related to the search information or the plurality of search results and wherein the paid advertisement comprises at least one paid advertising link;
  n. combining the at least one paid advertising link with the plurality of search results;
  o. sending a response, the response comprising the combined at least one paid advertising link and the plurality of search results, the response configured to cause the combined at least one paid advertising link and the plurality of search results to be displayed;
  p. collecting account information and establish an account for the user based on the collected account information;
  q. crediting the account of the user when it is determined that the paid advertising link was used to generate the revenue for the advertiser by way of the user making a purchase; and
  r. causing information associated with the account of the user, information on an activity of the user and information on a credit amount credited to the account of the user to be stored in at least one storage area allocated on the non-transitory storage device, wherein the plurality of search results are free search results.

16. The non-transitory computer-readable medium of claim 15, wherein the method further comprises providing a portion of the generated revenue to an operator of the search and advertising system.

17. The non-transitory computer-readable medium of claim 15, wherein the method further comprises providing a payment to an operator of the search and advertising system.

18. The non-transitory computer-readable medium of claim 15, wherein the information associated with the account of the user, the information on activity of the user and the information on a credit amount credited to the account of the user is stored in a storage area allocated on the non-transitory storage device.

19. The non-transitory computer-readable medium of claim 15, wherein the paid advertising link is designated with a visual object indicating that if the user takes a predetermined action, the user would be given a credit.

20. The non-transitory computer-readable medium of claim 15, wherein the paid advertising link is highlighted.

\* \* \* \* \*